(12) United States Patent
Faccin et al.

(10) Patent No.: US 7,123,920 B1
(45) Date of Patent: Oct. 17, 2006

(54) TECHNIQUE FOR SETTING UP CALLS IN MOBILE NETWORK

(75) Inventors: Stefano Faccin, Dallas, TX (US); Yousuf Saifullah, Flower Mound, TX (US); Srinivas Sreemanthula, Arlington, TX (US); Tuija Hurtta, Espoo (FI); Nedko Ivanov, Budapest (HU); Balazs Bertenyi, Budapest (HU)

(73) Assignee: Nokia Corporation, Espoo (FI)

( * ) Notice: Subject to any disclaimer, the term of this patent is extended or adjusted under 35 U.S.C. 154(b) by 371 days.

(21) Appl. No.: 09/828,127

(22) Filed: Apr. 9, 2001

Related U.S. Application Data (63) Continuation-in-part of application No. 09/546,209, filed on Apr. 10, 2000, now abandoned.

(51) Int. Cl.
*H04Q 7/20* (2006.01)
*H04Q 7/00* (2006.01)
*H04B 7/00* (2006.01)
*H04J 3/14* (2006.01)
*H04J 3/24* (2006.01)

(52) U.S. Cl. .................. 455/450; 455/455; 455/452.1; 455/517; 370/230; 370/329; 370/338; 370/469

(58) Field of Classification Search ................ 455/450, 455/455, 452.1, 418, 420, 507, 517; 370/229, 370/230, 329, 335, 336, 337, 338, 468, 469
See application file for complete search history.

(56) References Cited

U.S. PATENT DOCUMENTS

| | | | | |
|---|---|---|---|---|
| 5,422,883 A | * | 6/1995 | Hauris et al. | 370/261 |
| 5,978,368 A | | 11/1999 | Hjelm et al. | 370/347 |
| 6,320,873 B1 | | 11/2001 | Nevo et al. | 370/466 |

(Continued)

FOREIGN PATENT DOCUMENTS

WO WO 99/37103 7/1999

OTHER PUBLICATIONS

General Packet Radio Service (GPRS) Service Description, Stage 2, 3G TS 23.060, Version 3.2.1 (1999).

(Continued)

*Primary Examiner*—George Eng
*Assistant Examiner*—Un C. Cho
(74) *Attorney, Agent, or Firm*—Squire, Sanders & Dempsey, LLP.

(57) ABSTRACT

In a technique for setting up calls in IP mobile networks, when an application level in a mobile station sends a setup message to set up a multimedia call, before sending such a message over the radio interface, the mobile station performs the appropriate procedures to setup the appropriate bearers over the radio interface and in the network to satisfy the call requirements specified by the application level in the setup message. The technique applies to both mobile originated calls and mobile terminated calls, the called mobile station performing the transport level procedures after having received a setup message and before sending a confirmation/call acceptance message back to the calling party. Furthermore, the allocation of radio resources for PDP contexts that will be used to carry the media of a multimedia IP called is delayed so that no radio resources are allocated to the PDP contexts activated before the call control signaling is exchanged. The radio resources are allocated only when the call signaling has been completed and the called party has accepted the call and indicated the call characteristics that it can support. An indication is forwarded from the SGSN to the GGSN advising that no packets are to be sent on the PDP context because there are no radio resources for the PDP context.

21 Claims, 4 Drawing Sheets

U.S. PATENT DOCUMENTS

| | | | |
|---|---|---|---|
| 6,374,112 B1* | 4/2002 | Widegren et al. | 455/452.2 |
| 6,434,140 B1 | 8/2002 | Barany et al. | 370/352 |
| 6,510,174 B1 | 1/2003 | Sexton et al. | 375/213 |
| 6,529,497 B1 | 3/2003 | Hjelm et al. | 370/347 |
| 6,529,525 B1 | 3/2003 | Pecen et al. | 370/469 |
| 6,532,227 B1 | 3/2003 | Leppisaari et al. | 370/348 |
| 6,570,856 B1 | 5/2003 | Freeburg et al. | 370/310.1 |
| 6,683,853 B1* | 1/2004 | Kannas et al. | 370/237 |
| 6,834,186 B1* | 12/2004 | Gallagher et al. | 455/411 |
| 2001/0043577 A1* | 11/2001 | Barany et al. | 370/328 |
| 2002/0034166 A1* | 3/2002 | Barany et al. | 370/329 |
| 2002/0131395 A1* | 9/2002 | Wang | 370/349 |

OTHER PUBLICATIONS

GSM Technical Specification 08.58 Version 5.2.0 Jul. 1996.

Call Control in the Mobile Terminal of a Wireless ATM Network; S. Martignoni, D. Sanchez & Y.S. Wu; Proceedings 1998 International Zurich Seminar on Accessing, Transmission, Networking, Zurich, Switzerland, Feb. 17-19, 1998, IEEE 1998 pp. 135-141.

* cited by examiner

TECHNIQUE FOR SETTING UP CALLS IN MOBILE NETWORK

CROSS-REFERENCE TO RELATED APPLICATIONS

This application is a continuation-in-part of U.S. application Ser. No. 09/546,209, filed in the U.S. Patent and Trademark Office on Apr. 10, 2000, now abandoned.

BACKGROUND OF THE INVENTION

1. Field of the Invention

The present invention relates to mobile networks and, more particularly, the present invention relates to a technique for setting up multimedia calls in mobile networks using an IP (Internet Protocol) transport mechanism.

2. Description of the Related Art

In general, packet switched wireless networks provide communications for mobile terminals with no physical connection required for network access. The General Packet Radio Service (GPRS) in the Global System for Mobile Communications (GSM) and the Universal Mobile Terrestrial System (UMTS) have both been developed to provide wireless communications networks with a packet switched side, as well as a circuit switched side.

The specification for a UMTS network with further improvements has been released by the 3rd General Partnership Project. The UMTS specification provides that a network subscriber can have one or more packet data protocol (PDP) addresses. Each PDP address is described by one or more PDP contexts in the Mobile Station (MS), the Service GPRS Service Node (SGSN), and the Gateway GPRS Service Node (GGSN). A GGSN is a gateway to an external network. Each PDP context may have routing and mapping information for directing the transfer of data to and from its associated PDP address and a traffic flow template (TFT) for reviewing the transferred data.

Each PDP context can be selectively and independently activated, modified, and deactivated. The activation state of a PDP context indicates whether data transfer is enabled for a corresponding PDP address and TFT. If all PDP contexts associated with the same PDP address are inactive or deactivated, all data transfer for that PDP address is disabled. All PDP contexts of a subscriber are associated with the same Mobility Management (MM) context for the International Mobile Subscriber Identity (IMSI) of that subscriber. Setting up a PDP context means setting up a communications channel.

Figure 2:
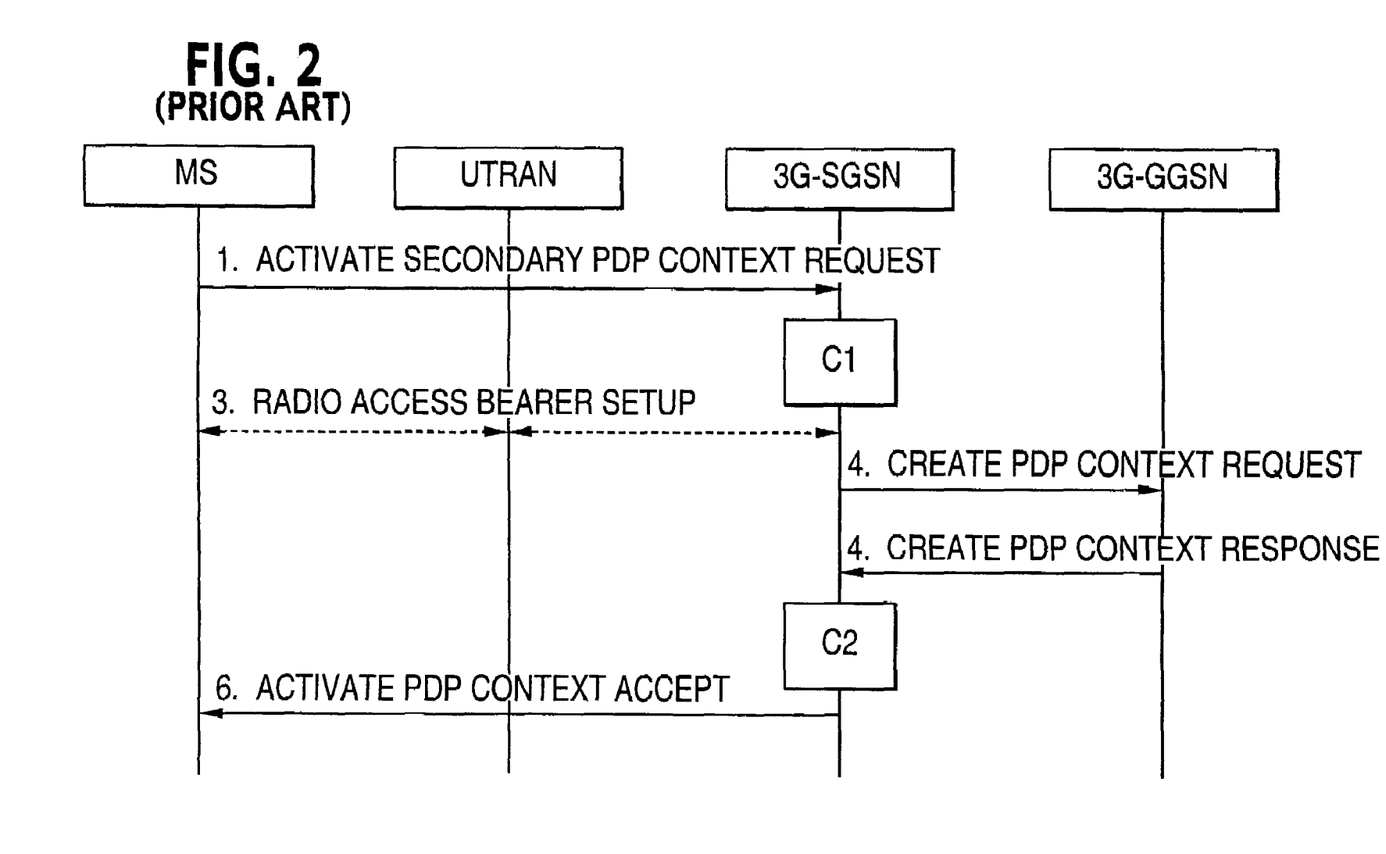
FIG. 2 is a generalized signaling flow diagram illustrating the prior art PDP context activation procedures.

An example of the PDP context activation procedure is shown in FIG. 2. The activate PDP context request message sent in step 1 includes a number of parameters. The parameters include a PDP address and an Access Point Name (APN). The PDP address is used to indicate whether a static PDP or dynamic PDP address is required. The APN is a logical name referring to the Gateway GPSR Support Node (GGSN) to be used. In step 3, the SGSN sends a Radio Access Bearer (RAB) setup message to the UMTS Terrestrial Radio Access Network (UTRAN). In step 4, the SGSN sends a Create PDP Context Request message to the affected GGSN. The GGSN decides whether to accept or reject the request. If it accepts the request, it modifies its PDP context table and returns a Create PDP Context Response message. The SGSN then sends an activate PDP Context Accept message to the MS in step 5.

In spite of the numerous details provided in the aforementioned Protocol, many features associated with IP mobile networks have not been addressed. Specifically, the techniques for expeditiously setting up multimedia calls in IP-based mobile networks have yet to be incorporated in the aforementioned Protocol. It is these details to which the present invention is directed.

SUMMARY OF THE INVENTION

The signaling that is exchanged by the application layers in the MS (mobile station) and in the network is arranged in accordance with the procedure/messages that need to be performed by the transport levels in the MS and in the network in order to set up multimedia calls.

When the application level in the MS sends a set up message to set up a multimedia call, before sending such a message over the radio interface, the MS performs the appropriate procedures, depending on the type of access adopted, to set up the appropriate bearers over the radio interface and in the network to satisfy the call requirements specified by the application level in the set up message.

The present invention applies to both the case of mobile originated calls and mobile terminated calls, the called MS performing the above noted transport level procedures after having received a set up message and before sending a confirmation/call acceptance message back to the calling party.

In accordance with the technique of the present invention, the allocation of radio resources for PDP (packet data protocol) contexts that will be used to carry the media of a multimedia IP call is delayed so that no radio resources are allocated to the PDP contexts activated before the call control signaling is exchanged. The radio resources are allocated only when the call signaling has been completed and the called party has accepted the call and indicated the call characteristics that it can support.

Furthermore, in accordance with the technique of the present invention, an indication is forwarded from the SGSN (Serving GPRS (General Packet Radio Service) Support Node) to the GGSN (Gateway GPRS Support Node) advising that no packets are to be sent on the PDP context because there are no radio resources for the PDP context.

BRIEF DESCRIPTION OF THE DRAWINGS

The foregoing and a better understanding of the present invention will become apparent from the following detailed description of example embodiments and the claims when reading in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

DETAILED DESCRIPTION OF THE INVENTION

Before beginning a detailed description of the subject invention, mention of the following is in order, when appropriate, like reference numerals and characters may be used to designate identical, corresponding, or similar components in differing drawing figures. Furthermore, in the detailed description to follow, example sizes/models/values/ranges may be given, although the present invention is not limited thereto.

Figure 1:
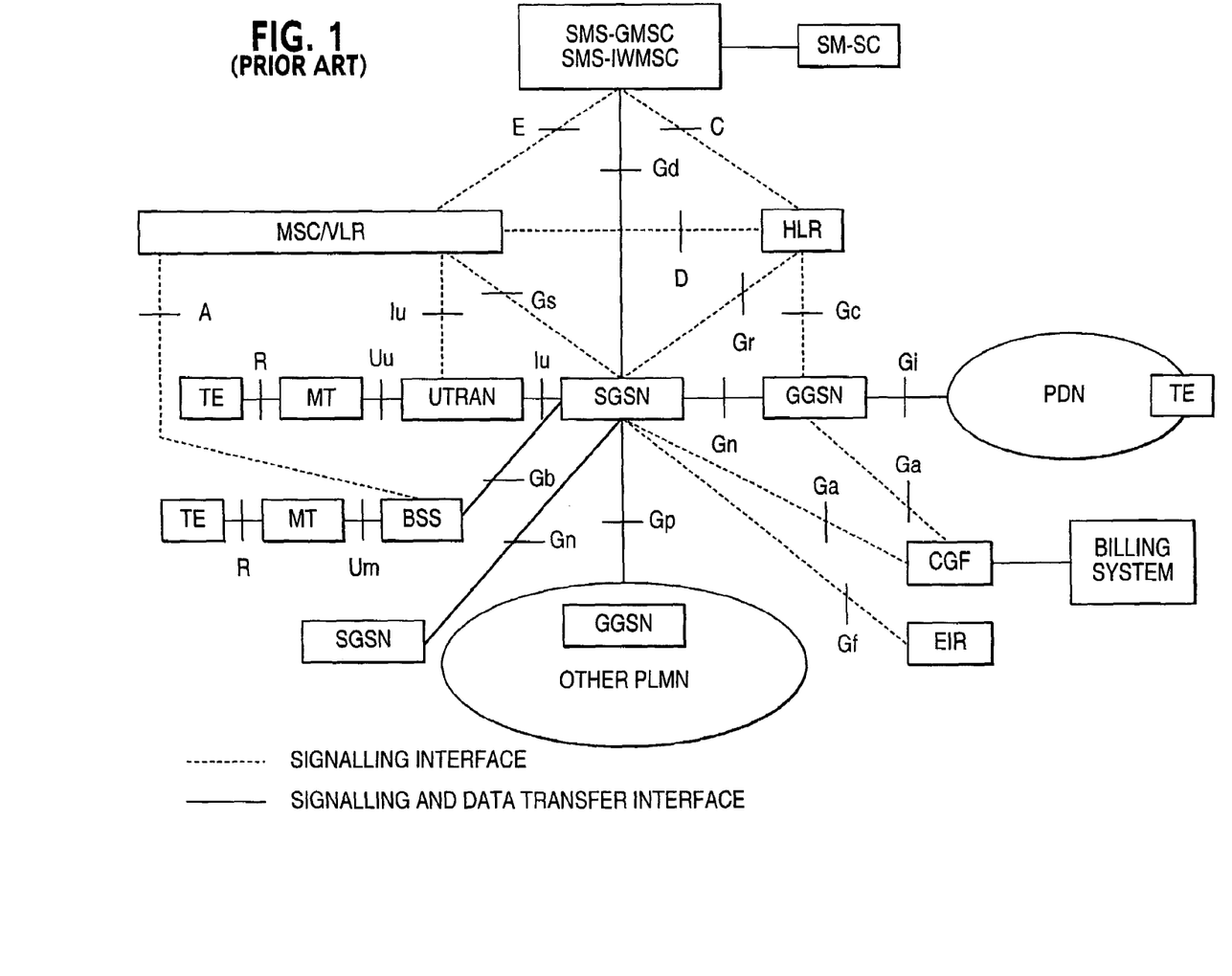
FIG. 1 is a generalized block diagram of the prior art architecture of a packet switched wireless communication network in which the example embodiments of the invention may be practiced.

An example of a network architecture supporting these specifications is the wireless communications network shown in the block diagram of FIG. 1. The various elements of the network and their functions are described in the 3rd Generation Partnership Project (3GPP); Technical Specification Group Services and System Aspects; Architecture Principles for Release 2000 (3G TR 23.821 version 1.0.0), published by the 3rd Generation Partnership Project and which is hereby incorporated herein by reference in its entirety. The elements and their functions may be described in earlier or later versions of the specifications or maybe those of any other known packet switched wireless communications network. The description of network elements and their functions incorporated by reference herein are merely a non-limiting example of packet switched wireless communication networks.

Several elements of the example network illustrated in FIG. 1 are particularly relevant to this invention. The Mobile Terminal (MT), commonly referred to as a cell phone or a mobile phone, is only one possible part of User Equipment (UE). Typically, Terminal Equipment (TE), used together with a Mobile Terminal (MT), constitutes User Equipment (UE) or a Mobile Station (MS). Any UE may be utilized in conjunction with this invention so that it operates or can be programmed to operate in the manner described below. The UMTS Terrestrial Radio Access Network (UTRAN) and the Base Station System (BSS) in GPRS manage and control the radio access between the network and a number of Mts.

The Serving GPRS Support Node (SGSN) is the node that serves the MT. At PDP Context Activation, the SGSN establishes a PDP context used for routing purposes. The Gateway GPRS Support Node (GGSN) is the node accessed by the packet data network due to evaluation of the PDP address. It contains routing information for attached GPRS users. The routing information is used to tunnel Protocol Data Units (PDUs) to the SGSN. The SGSN and GGSN functionalities may reside in different physical nodes or may be combined in the same physical node, for example, an Internet GPRS Support Node (IGSN).

Figure 3:
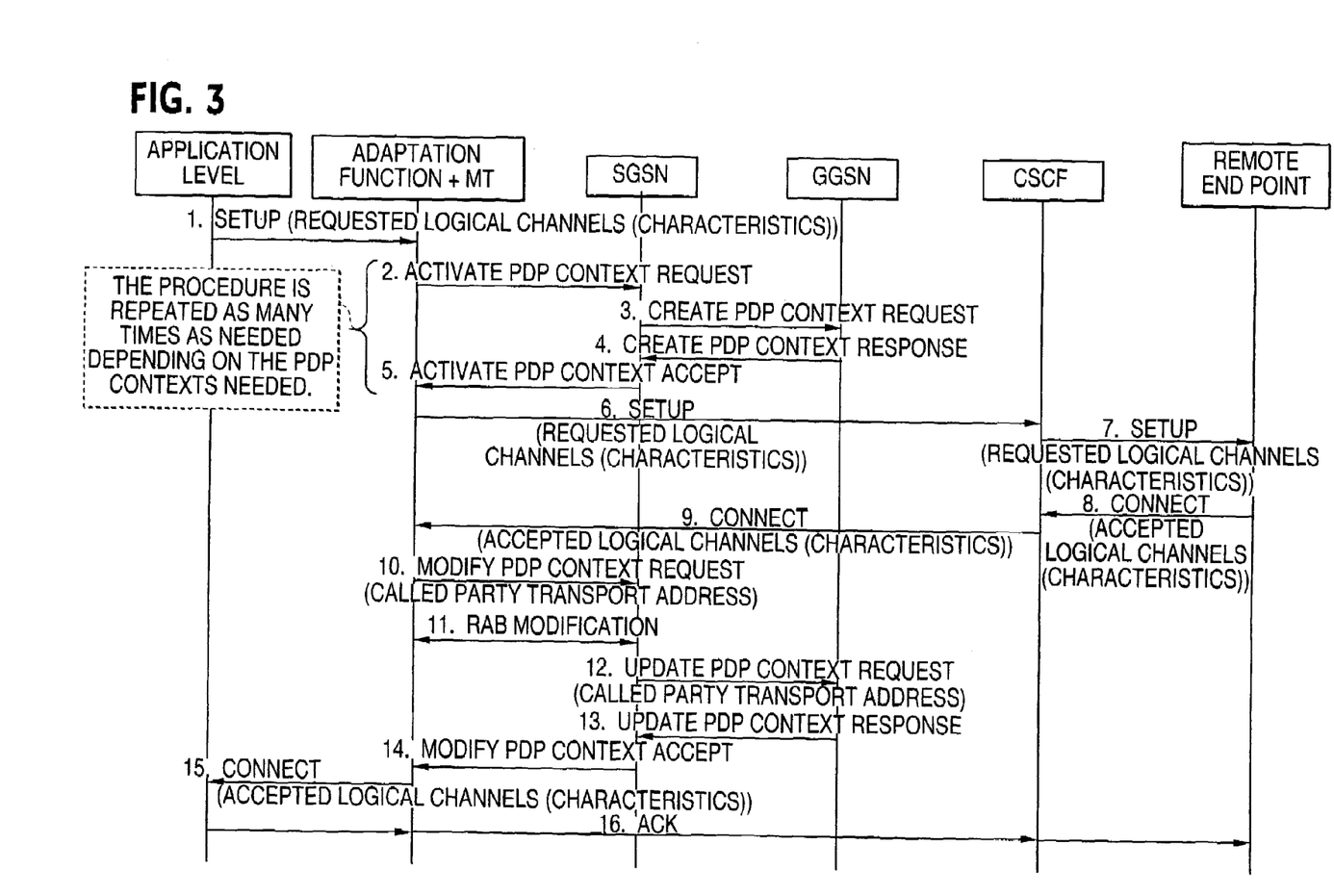
FIG. 3 is a generalized signal flow diagram illustrating a call set up arrangement.

FIG. 3 illustrates the call set-up arrangement. The IP-based mobile network architecture includes an application level and a transport level. The transport level protocols and mechanisms are usually optimized for the specific type of access whereas the application level is normally generic, that is independent of the type of access.

In IP-based mobile networks, the application level in the MS sets up a call by signaling to the peer entity and exchanging messages of a call control protocol over an IP connection provided by the transport levels. In setting up a call for the application level, the underlying transport level has to set up the transport bearers over the radio interface and in the network. For an IP-based mobile network, setting up of transport bearers means allocating radio resources and network resources. Since the call control signaling is transparently exchanged over an IP connection provided by the transport level, the transport levels are not aware that a call is being set up.

As illustrated in FIG. 3, the technique begins at the application level at step 1 in which a set up indication is forwarded from the application level to the mobile terminal MT or MS level, the set up indication including the requested logical channels and characteristics.

At step 2, an Activate PDP Context Request is transmitted to the SGSN from the MT. In response thereto, in step 3, the SGSN transmits a Create PDP Context Request to the GGSN. In response to the Create PDP Context Request from the SGSN, in step 4, a Create PDP Context Response is transmitted from the GGSN to the SGSN. In turn, in response to the Create PDP Context Response from the GGSN to the SGSN, in step 5, an Activate PDP Context Accept is transmitted to the MT or MS by the SGSN.

The above-noted procedures in steps 2–5 are repeated as many times as needed depending on the number of PDP contexts needed.

Upon the completion of the last procedure in step 5, the MT transmits a Setup indication, including requested logical channels and characteristics, to the CSCF (Call State Control Function) in step 6. The CSCF, in turn, transmits the Setup indication, including requested logical channels and characteristics, to the REP (Remote End Point) in step 7. The REP then transmits a Connect indication, including accepted logical channels and characteristics, back to the CSCF in step 8. The CSCF then transmits the Connect indication, including accepted logical channels and characteristics, to the MT in step 9.

In step 10, the MT transmits a Modify PDP Context Request, including a Called Party TA (Transport Address), to the SGSN. In step 11, the SGSN performs an RAB Modification. In step 12, in response to the RAB Modification, the SGSN transmits an Update PDP Context Request, including the Called Party TA, to the GGSN. In response to the Updated PDP Context Request, the GGSN, in step 13, transmits an Update PDP Context Response to the SGSN. In response thereto, the SGSN, in step 14, transmits a Modify PDP Context Accept to the MT. The MT, in turn, transmits a Connect indication including accepted logical channels and characteristics to the application level in step 15. Lastly, in step 16, the application level transmits an ACK (acknowledgement) indication to the REP via the CSCF.

The technique noted above, is based on a very simple mechanism and applies to different types of transport levels. In addition, the technique does not require any interface on the network side for the interaction between the application level and the transport level.

Unfortunately, in the technique illustrated in FIG. 3, resources for PDP contexts that will be used to carry the media of a multimedia call are immediately allocated, thereby resulting in wasted radio resources upon the called party being unable to accept the call.

Figure 4:
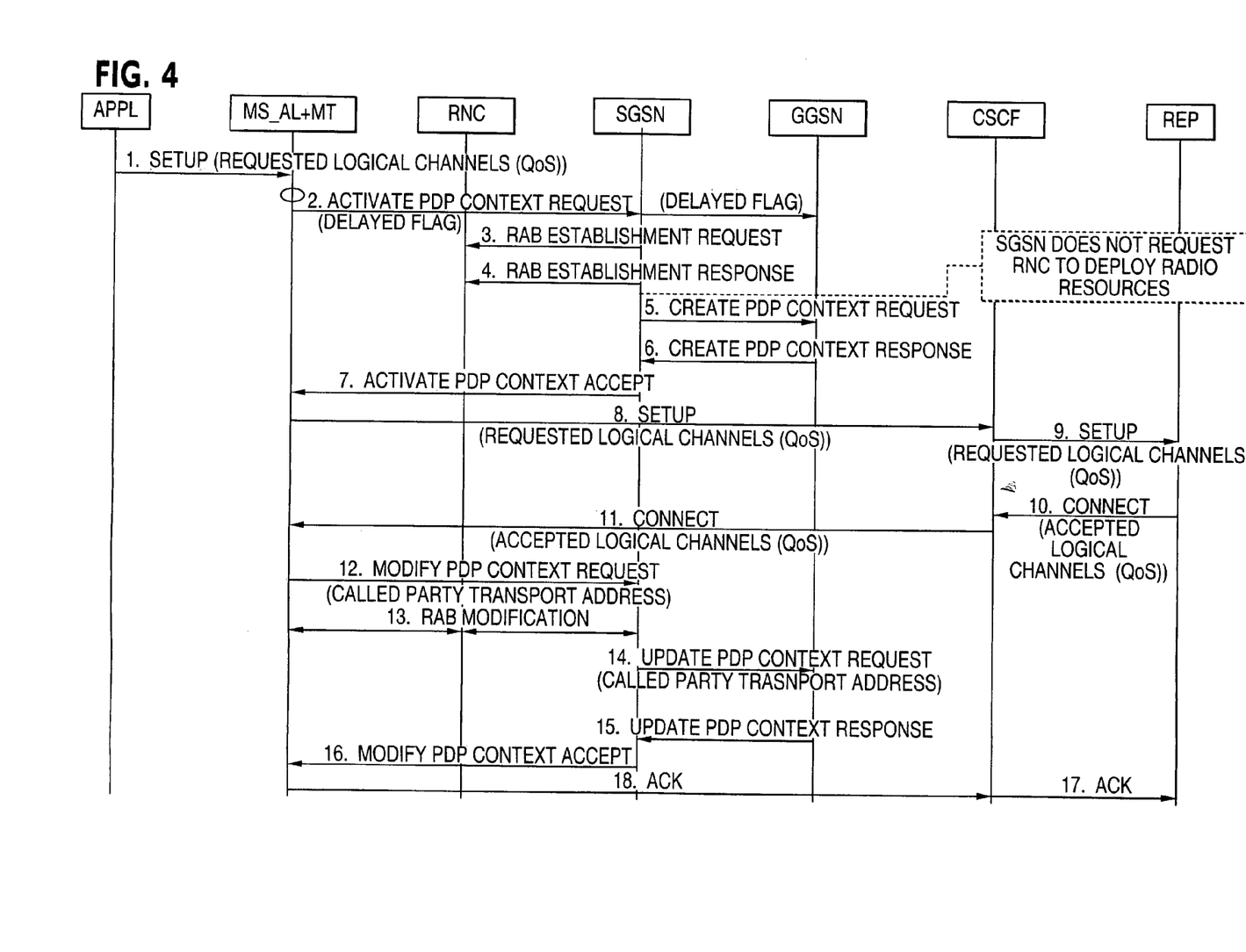
FIG. 4 is a generalized signal flow diagram illustrating a delayed resource deployment arrangement in accordance with a technique of the present invention.

FIG. 4 illustrates an example of the technique in accordance with the present invention. As illustrated therein, the allocation of resources for PDP contexts that will be used to carry the media of a multimedia IP call is delayed so that no radio resources are allocated to the PDP contexts before the call control signaling is exchanged. Rather, the radio resources are allocated only when the call signaling has been completed and the called party has accepted the call and indicated the call characteristics that it can support.

As illustrated in FIG. 4, in step 1, the application level transmits a set up indication, including requested logical channels and characteristics, to the mobile terminal MT level, that is, the MS.

In step 2, an Activate PDP Context Request including a Delayed Flag is transmitted from the mobile terminal MT level, that is, the MS, to the SGSN. The Delayed Flag is a new parameter which is added to the Activate PDP Context Request so as to inform the SGSN that no radio resources have to be allocated. This ensures that the radio resources will be allocated only after the PDP context has been modified. Note that the Delayed Flag may also be transmitted to the GGSN as well as to the SGSN. While this is optional, it is preferable in that in some arrangements, it is advantageous for the GGSN to be informed that no radio resources have been allocated. When receiving the Delayed Flag, the GGSN may restrict traffic on the PDP context. The GGSN may store a flag indicating that no traffic is allowed to be carried on the PDP context or may set the TFT of the PDP context so that no traffic can be carried on the PDP context.

In step 3, the SGSN transmits the Delayed Flag in a RAB Establishment Request to a RNC in a radio access network. When receiving the Delayed Flag, the RNC checks the availability of radio access network resources. In step 4, the RNC sends RAB Establishment Response to the SGSN to indicate the result of the radio access network resource check.

In step 5, the SGSN transmits a Create PDP Context Request to the GGSN which in turn transmits a Create PDP Context Response to the SGSN in step 6. In step 7, the SGSN transmits an Activate PDP Context Accept to the MS. In step 8, the MS forwards a Setup indication including requested logical channels and characteristics to the CSCF which, in turn, transmits a Setup indication including requested logical channels and characteristics to the REP in step 9.

In step 10, the REP transmits a Connect indication including accepted logical channels and characteristics to the CSCF. In step 11, a Connect indication including accepted logical channels and characteristics are transmitted from the CSCF to the MS. In step 12, the MS creates a Modify PDP Context Request including the Called Party Transport Address and transmits it to the SGSN.

In step 13, the SGSN, together with the MS and an RNC, for example, perform an RAB Modification. In step 14, the SGSN transmits an Update PDP Context Request including the Called Party Transport Address to the GGSN which, in turn, in step 15, transmits an Update PDP Context Response back to the SGSN. In step 16, the SGSN transmits a Modify PDP Context Accept to the MS which in turn forwards an ACK indication to the CSCF in step 17 which in turn transmits it to the REP in step 18.

In setting up a call for an application, the underlying transport network sets up the transport bearers over the radio interface and in the network. For a wireless network, the setting up of transport bearers means the allocation of radio resources.

By utilizing the above-noted call setup technique in accordance with the present invention utilizing the delayed flag, radio resources over the wireless interface are not wasted due to unsuccessful call setups, (for example, called party busy, no answer, wrong number, etc.). Any effort to maximize the usage performance of radio resources is a must for wireless operators with limited frequency spectrum availability.

Before the call control signaling is exchanged between the calling party and the called party, the only information available regarding the radio and network resources needed for the call are the resources requested by the calling party. Since the called party may not accept the call features, (for example, medias and QoS), proposed by the calling party and rather proposes a subset of the requested features, allocating radio and network resources prior to the call signaling being completed leads to wasted resources and in fact, the radio resources that have been allocated will be unused during the time between the call initiation and the call setup completion. However, by utilizing the delayed flag in accordance with the technique of the present invention, resources are not wasted since they are allocated only after the PDP Context has been modified.

Furthermore, until the call setup signaling has been performed, the calling party does not know the TA (Transport Address), that is, the IP address plus port number, or the called party and therefore cannot provide the complete TFT (Traffic Flow Template) to the SGSN/GGSN. The technique of the present invention, by modifying the PDP context, avoids this problem.

As a modification to the above-noted technique in accordance with the present invention which utilizes the delayed flag, as an additional step, the SGSN, upon receiving the delayed flag, forwards the delayed flag to the GGSN as an indication that no packets should be sent on the PDP Context because there are no radio resources, (that is, no RAB), for the PDP context. In addition, the SGSN may set the charging characteristics of the PDP context as "free of charge". The SGSN indicates the charging characteristics of the PDP Context to the GGSN in the Create PDP Context Request message.

It is to be noted that in the description of the invention above, numerous details known to those skilled in the art have been omitted for the sake of brevity. Such details are readily available in numerous publications including the previously cited Protocol. Accordingly, the contents of the previously cited Protocol are incorporated by reference herein.

This concludes the description of the example embodiments. Although the present invention has been described with reference to a number of illustrative embodiments, it should be understood that numerous other modifications and embodiments can be devised by those skilled the art which will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled the art.

What is claimed is:

1. A method of setting up a communication session in a wireless communications network comprising at least a radio access network, an application layer and a transport layer, the method comprising:

transmitting a request for a communication channel setup from a user equipment to a first network element in said transport layer of the wireless communications network; and wherein the communication channel carries content of the communication session, and wherein the request contains an indication to the first network element that radio resource allocation is to be prevented for the communication channel in the transport layer before the communication session in the application layer has been successfully established.

2. The method of claim 1, comprising the steps of:
forwarding the indication to a second network element in the radio access network; and
in response to receiving the indication, the second network element refrains from allocating radio resources for the communication channel.

3. The method of claim 2, comprising the steps of:
setting up the communication channel for the user equipment by the means of the first network element without radio resources;
setting up a communication session between the user equipment and a third network element in the application layer of the wireless network; and
allocating radio resources for the communication channel when the communication session has been successfully established.

4. The method of claim 3, wherein the application layer is an IMS network.

5. A method of claim 3, wherein the third network element is a CSCF.

6. A method of claim 2, wherein the second network element is an RNC.

7. The method of claim 1 comprising a step of indicating to a fourth network element in the transport layer of the wireless network that radio resources are not allocated for the communication channel before the communication session has been successfully established.

8. A method of claim 5, wherein the fourth network element is a GGSN.

9. The method of claim 1, wherein the transport layer comprises a core network.

10. A method of claim 1, wherein the first network element is a SGSN.

11. A method in accordance with claim 1, wherein:
the indication contains a flag which indicates to the first network element that radio allocation is to be prevented for the communication channel before a communication session has been established.

12. A user equipment in a wireless communications network, wherein the network comprises at least a radio access network, an application layer and a transport layer, the user equipment comprising:
a transmitter module that transmits a request for a communication channel setup to a first network element in said transport layer of the wireless communications network; and
wherein, the communications channel carries content of a communications session, and wherein the request contains an indication to the first network element that radio resource allocation is to be prevented for the communication channel in the transport layer before the communication session in the application layer has been successfully established.

13. A network device in a wireless communications network, wherein the network comprises at least a radio access network, an application layer and a transport layer, the network device comprising:
a receiver module, that receives an indication that radio resource allocation is to be prevented for a communication channel in the transport layer before a communication session in the application layer has been successfully established; and
a transmitter module that transmits the indication to a second network element.

14. A network device in a wireless communications network, wherein the communications network comprises at least a radio access network, an application layer and a transport layer, the network device comprising:
a receiver module, wherein the receiver module receives an indication from a second network device that network resource allocation is to be prevented for a communication channel in the transport layer before a communication session in the application layer has been successfully established; and
wherein the network device refrains from allocating radio resources for the communication channel in response to receiving the indication.

15. A network device in a wireless communications network, wherein the network comprises at least a radio access network, an application layer and a transport layer, the network device comprising:
a receiver module that receives an indication from a user equipment that network resource allocation is to be prevented for a
communication channel in the transport layer before a communication session in the application layer has been successfully established; and
a restriction module that restricts traffic on the communication channel based after the indication is received in the receiver module.

16. A system for setting up a communication session in a wireless communications network comprising at least a radio access network, an application layer and a transport layer, the system comprising:
a user equipment, wherein the user equipment transmits a request for a communication channel setup, wherein the request contains an indication that radio resource allocation is to be prevented for the communication channel in the transport layer before the communication session has been successfully established;
a first network element that receives the indication from the user equipment, and forward the indication to at least one other network device in the system;
a second network element that receives the indication in the radio access network from the first network element; and
a third network element, wherein a fourth network element receives the indication from the user equipment, wherein the third network element restricts traffic on the communications channel until the communication session has been successfully established.

17. An apparatus in a wireless communications network, wherein the network comprises at least a radio access network, an application layer and a transport layer, the apparatus comprising:
a transmitter means for transmitting a request for a communication channel setup to a first network element in said transport layer of the wireless communications network; and
wherein, the communications channel carries content of a communications session, and wherein the request contains an indication to the first network element that radio resource allocation is to be prevented for the communication channel in the transport layer before the communication session in the application layer has been successfully established.

18. An apparatus in a wireless communications network, wherein the network comprises at least a radio access network, an application layer and a transport layer, the apparatus comprising:

a receiver means, for receiving an indication that radio resource allocation is to be prevented for a communication channel in the transport layer before a communication session in the application layer has been successfully established; and a transmitter means for transmitting the indication to a second network element.

19. An apparatus in a wireless communications network, wherein the communications network comprises at least a radio access network, an application layer and a transport layer, the apparatus comprising:

a receiver means, for receiving an indication from a second network device that network resource allocation is to be prevented for a communication channel in the transport layer before a communication session in the application layer has been successfully established; and wherein the apparatus refrains from allocating radio resources for the communication channel in response to receiving the indication.

20. An apparatus in a wireless communications network, wherein the network comprises at least a radio access network, an application layer and a transport layer, the apparatus comprising:

a receiver means for receiving an indication from a user equipment that network resource allocation is to be prevented for a communication channel in the transport layer before a communication session in the application layer has been successfully established; and a restriction means for restricting traffic on the communication channel based after the indication is received in the receiver means.

21. A system for setting up a communication session in a wireless communications network comprising at least a radio access network, an application layer and a transport layer, the system comprising:

a user equipment means, wherein the user equipment means transmits a request for a communication channel setup, wherein the request contains an indication that radio resource allocation is to be prevented for the communication channel in the transport layer before the communication session has been successfully established;

a first network means for receiving the indication from the user equipment means, and forwards the indication to at least one other network means in the system;

a second network means for receiving the indication in the radio access network from the first network means; and a third network means, wherein a fourth network means receives the indication from the user equipment means, wherein the third network means restricts traffic on the communications channel until the communication session has been successfully established.

* * * * *